3,129,182
CUTTING FLUID
Francis Parker McLean, Seattle, Wash., assignor to The Boeing Company, Seattle, Wash., a corporation of Delaware
No Drawing. Filed Aug. 15, 1962, Ser. No. 216,974
2 Claims. (Cl. 252—54)

This invention relates to cutting fluids, and more particularly to cutting fluids utilized in applications such as drilling aluminum, where after such drilling, paints and/or sealants are to be applied to the aluminum.

Oil, soluble oil and wax currently used in conjunction with fixed and portable apparatus for machining of parts and assemblies create one or more of the following production problems: (1) removal after use; (2) wide variation in tool cutting edge to work tolerances; (3) inadequate cooling at high cutting speeds; (4) coolant tank, pump, and filter maintenance; and (5) contamination of coolant.

Prior attempts to solve the problem have centered around (1) dry machining; (2) use of unsoluble oils; (3) soluble oils and (4) paraffin wax with strict control of the subsequent cleaning sequences. The dry machining attempts were not successful because of shortened tool life and an unpredictable tolerance range on the workpiece. The above mentioned cutting agents improved tool life and gave tolerance ranges that are generally predictable within certain limits. The major disadvantage of their use is in the cleaning sequences that must be arranged to provide uncontaminated face surfaces for painting, sealing, threading, etc., because they leave residues which are difficult to remove, cannot be detected when small quantities remain, and prevent good adhesion of paints and sealants.

The present invention is based on the discovery that a mixture of a Freon and butyl Cellosolve applied as a cutting fluid for use in machining of parts and assemblies, where paints and/or sealants are to be thereafter applied to the machined part or assembly, overcomes the above mentioned production problems created by the currently used cutting agents.

Therefore, it is an object of the invention to provide a cutting fluid which leaves no residues affecting adhesion of paints and sealants.

A further object of the invention is to provide a cutting fluid which gives performance equivalent to or better than cutting agents currently in use.

A still further object of the invention is to provide a cutting fluid which meets industrial hygiene requirements for the protection of personnel.

Another object of the invention is to provide a cutting fluid which meets fire protection limitations on the use of highly volatile liquids.

Another object of the invention is to provide a cutting fluid comprising a mixture of a Freon and butyl Cellosolve.

Another object of the invention is to provide a cutting fluid consisting of a mixture of tricholorotrifluoroethane in the range between 36 to 44 parts by volume and butyl Cellosolve in the range between 0.9 to 1.1 parts by volume.

Another object of the invention is to provide a cutting fluid consisting of a mixture of tricholortrifluoroethane and butyl Cellosolve applied in a mist for use in drilling aluminum where paints and/or sealants are to be used.

These and other objects of the invention not specifically set forth above will become readily apparent from the accompanying description.

The cutting fluid of the present invention comprises a particular mixture of a Freon and butyl Cellosolve. The specific mixture described herein for purpose of illustration consists of Freon 113 (trichlorotrifluoroethane) in the range between 36 to 44 parts by volume and butyl Cellosolve (ethylene glycol monobutyl ether) in the range between 0.9 to 1.1 parts by volume. It has been determined that the most efficient mixture is 40 parts tricholortrifluoroethane and 1 part butyl Cellosolve.

To establish the advantages of the cutting fluid of the invention over the prior cutting agents, a series of tests were conducted to determine the effect on (1) sealant adhesion; (2) paint adhesion; (3) drill performance; (4) corrosion; (5) industrial hygiene; and (6) fire protection.

It was found that the adhesion qualities of test panels treated with the cutting fluid of the invention were equivalent or better than test panels which were solvent cleaned after the same cutting agent was applied and air dried.

It was found in drill performance tests using the cutting fluid of the invention, that of the approximately 4000 holes drilled, all were within +0.003, −0.000 nominal 0.253 drill diameter required for ¼ inch fluid tight rivets.

In corrosion tests which utilized panels having ¼ inch diameter holes drilled therein using the cutting fluid of the invention and hung in a humid atmosphere at room temperature (70° F.) for 7 days, it was found that (1) bare aluminum had no corrosion; (2) zinc chromate primed aluminum had no corrosion and no loosening or flaking of primer; (3) bare magnesium had slight corrosion (localized) on narrow edges and no corrosion on the flat sides or the hole; (4) bare steel had considerable general corrosion (rusting) over entire panel; and (5) cadmium plated steel had slight stain or discoloration adjacent the hole and rusting of the exposed steel in the hole. In another type corrosion test, wherein test panels of the same material as the above test had no holes drilled therein but were placed in the cutting fluid and located in an air-tight container to prevent complete evaporation of the cutting fluid for a period of 48 hours at room temperature, it was found that all specimens were satisfactory with no corrosion noted.

In the industrial hygiene tests for the protection of personnel under prolonged exposure to the cutting fluid of the invention, it was determined that no hazardous buildup of vapors was foreseen assuming normal, good ventilation in a large room, such as the wing line for aircraft manufacturing, and providing that the maximum concentration for prolonged exposure to butyl Cellosolve vapor is under 1.0 fl. oz. evaporated in 1000 cu. ft. of air and under 4.8 fl. oz. per 100 cu. ft of air for trichlorotrifluoroethane vapor.

The fire protection tests showed that the use of the cutting fluid of the invention was satisfactory from a fire protection standpoint provided that the mixture be kept in closed containers at all times, to avoid concentration of the butyl Cellosolve due to evaporation of the Freon 113.

The cutting fluid of the invention is applied efficiently and economically in a mist by simple spray and/or air jet application equipment.

It is thus seen that the cutting fluid composed approximately of 1 part butyl Cellosolve and 40 parts trichlorotrifluoroethane by volume provides the following benefits over the prior known cutting agents: (1) simple spray and/or air jet application equipment is all that is needed for efficient use thereof; (2) no residual contamination is left by the fluid that interferes with sealant or paint adhesion; (3) high heat absorption caused by the expanding trichlorotrifluoroethane in combination with expanding compressed air causes instantaneous cooling of tool cutting edges; and (4) the instantaneous heat removal from cutting edges of tools reduces build-up, allows increased cutting speeds and feeds, gives finer finishes and highly accurate tool to work tolerances.

While the form of embodiment of the present invention constitutes a preferred form, it is to be understood that other forms might be adopted, all coming within the scope of the appended claims.

What I claim is:

1. A cutting fluid consisting essentially of a mixture of approximately 40 parts trichlorotrifluoroethane and 1 part ethylene glycol monobutyl ether.

2. A cutting fluid for use in machining and drilling operations consisting essentially of a mixture of trichlorotrifluoroethane in the range between 36 to 44 parts by volume and ethylene glycol monobutyl ether in the range between 0.9 and 1.1 parts by volume.

References Cited in the file of this patent

UNITED STATES PATENTS

| | | |
|---|---|---|
| 2,163,899 | Walker et al. | June 27, 1939 |
| 2,320,263 | Carlson et al. | May 25, 1943 |
| 2,516,838 | Schiermeier | Aug. 1, 1950 |
| 2,580,654 | Browning | Jan. 1, 1952 |
| 2,912,383 | Huth | Nov. 10, 1959 |